US008615742B2

(12) United States Patent
Indukuru et al.

(10) Patent No.: US 8,615,742 B2
(45) Date of Patent: Dec. 24, 2013

(54) AUTONOMIC HOTSPOT PROFILING USING PAIRED PERFORMANCE SAMPLING

(75) Inventors: Venkat Rajeev Indukuru, Austin, TX (US); Daniel Owen, Manchester (GB); Alexander Erik Mericas, Austin, TX (US); John Fred Spannaus, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 616 days.

(21) Appl. No.: 12/946,959

(22) Filed: Nov. 16, 2010

(65) Prior Publication Data

US 2012/0124560 A1    May 17, 2012

(51) Int. Cl.
*G06F 9/44*    (2006.01)
*G06F 9/45*    (2006.01)

(52) U.S. Cl.
USPC .......... 717/127; 717/124; 717/128; 717/131; 717/151; 717/154

(58) Field of Classification Search
None
See application file for complete search history.

(56) References Cited

U.S. PATENT DOCUMENTS

| | | | |
|---|---|---|---|
| 4,821,178 A | 4/1989 | Levin et al. | |
| 5,768,500 A * | 6/1998 | Agrawal et al. | 714/47.2 |
| 6,542,985 B1 | 4/2003 | Johnson et al. | |
| 7,082,486 B2 | 7/2006 | DeWitt et al. | |
| 7,536,288 B2 | 5/2009 | Nelson et al. | |
| 7,574,587 B2 | 8/2009 | DeWitt et al. | |
| 2005/0155026 A1* | 7/2005 | DeWitt et al. | 717/158 |
| 2008/0127120 A1* | 5/2008 | Kosche et al. | 717/131 |

OTHER PUBLICATIONS

Marty Itzkowitz, "Memory Profiling using Hardware Counters", 2003, ACM.*

* cited by examiner

*Primary Examiner* — Lewis A Bullock, Jr.
*Assistant Examiner* — Mark Gooray
(74) *Attorney, Agent, or Firm* — Robert H. Frantz; David A. Mims, Jr.

(57) ABSTRACT

A processor performance profiler is enabled to for identify specific instructions causing performance issues within a program being executed by a microprocessor through random sampling to find the worst-case offenders of a particular event type such as a cache miss or a branch mis-prediction. Tracking all instructions causing a particular event generates large data logs, creates performance penalties, and makes code analysis more difficult. However, by identifying and tracking the worst offenders within a random sample of events without having to hash all events results in smaller memory requirements for the performance profiler, lower performance impact while profiling, and decreased complexity to analyze the program to identify major performance issues, which, in turn, enables better optimization of the program in shorter developer time.

24 Claims, 6 Drawing Sheets

AUTONOMIC HOTSPOT PROFILING USING PAIRED PERFORMANCE SAMPLING

CROSS-REFERENCE TO RELATED APPLICATIONS (CLAIMING BENEFIT UNDER 35 U.S.C. 120)

None.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

None.

FIELD OF THE INVENTION

The invention generally relates to technologies for optimizing performance of microprocessors, processing elements and processor cores, especially to the tools and methods for determining sources of performance degradation.

BACKGROUND OF INVENTION

Modern microprocessors are very sophisticated compared to those developed two or three decades ago. Some microprocessors are packaged as an individual, discrete device for assembly onto a circuit board, while others are implemented as a "core" or a "processing element" (PE) in a manner which they may be combined with other functions into an integrated circuit (e.g. multiple processors in one package, a processor with support peripherals in another package, etc.).

A key driver for the increased complexity has been the need to increase single-threaded performance. High-performance microprocessors rely on deep execution pipelines, speculative execution and advanced prediction capabilities. In addition, in recent years multi-threading has been introduced with the aim of addressing the latency cost associated with accessing memory. Although this does not improve single-threaded performance, it offers an increase in the overall processing bandwidth of the computing system.

The complexity introduced with these advanced features makes it increasingly difficult for software designers to ensure there software will make optimal use of the underlying hardware.

Furthermore, given the heavy reliance on prediction and speculation, being able to resolve hardware events, such as cache misses and branch mispredicts, has become increasingly important. These issues means that to develop high performance code there is a need for detailed analysis of how the code runs on the microprocessor.

An important part of this analysis is to associate performance events to the source code, so that programs can take steps towards optimization. This is achieved using hardware profiling mechanisms provided in modern microprocessors, which allow the identification of the address(es) of instruction(s) which cause performance hazards, such as cache misses, on microprocessor.

Typical "profiler" configure the microprocessor hardware to count an interesting event, such as cache misses, so that when the number of cache misses exceed a threshold specified by the configuration, the hardware throws an interrupt, and additional program(s) can capture the exact effective address of the event that threw the interrupt.

SUMMARY OF THE INVENTION

A processor performance profiler is enabled to for identify specific instructions causing performance issues within a program being executed by a microprocessor through random sampling to find the worst-case offenders of a particular event type such as a cache miss or a branch mis-prediction. Tracking all instructions causing a particular event generates large data logs, creates performance penalties, and makes code analysis more difficult. However, by identifying and tracking the worst offenders within a random sample of events without having to hash all events results in smaller memory requirements for the performance profiler, lower performance impact while profiling, and decreased complexity to analyze the program to identify major performance issues, which, in turn, enables better optimization of the program in shorter developer time.

BRIEF DESCRIPTION OF THE DRAWINGS

The description set forth herein is illustrated by the several drawings.

FIGS. 1b-1d depict the operation of the performance counters during the logical process of FIG. 1a.

DETAILED DESCRIPTION OF EMBODIMENT(S) OF THE INVENTION

Figure 1A:
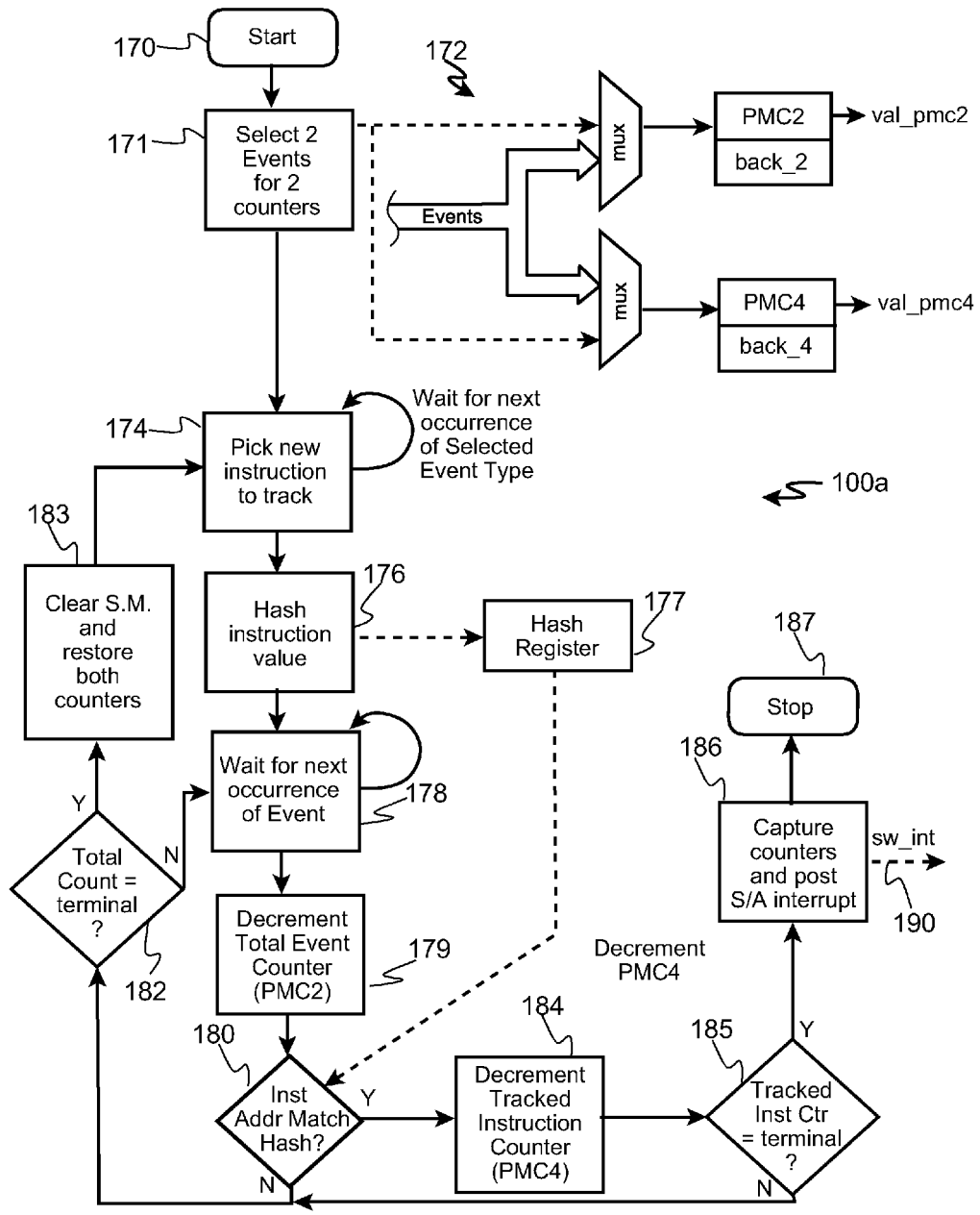
FIG. 1a illustrates one possible embodiment of a logical process according to the invention.

The inventors of the present invention have recognized a problem not previously addressed or recognized by those ordinarily skill in the art. The inventors discovered that while existing profiling methods are effective in identifying addresses of instructions which cause certain types of events in a processor (e.g. cache hits, branch mis-predictions, etc.), these same current profiling methods do not indicate to analysts or other programs how important or significant each of those instructions at those addresses are in terms of execution frequency. In other words it is possible instruction addresses identified by the existing profiling methods have actually only caused the watched event exactly once, or that it may have caused the event many, many times. So, the inventors have realized that if the profiler's identification of offending instruction instances leads to optimization on an instruction instances which only caused one or relatively few events, the optimization efforts will not have much, if any, effect on reducing the occurrence of the event, and thus, no optimization in performance would be achieved in actuality. The result is that optimization may include many attempts at increasing performance of the program on the processor before any real improvement is seen. Therefore, the inventors have discovered that profiling tools need to be enabled to determine and indicate the significance of each offending instruction instance, not just a list of instruction instances which have caused the event one or more times.

Embodiments of profilers according to the present invention provide a mechanism by which performance monitoring functions may indicate to a program which events are happening more often, thus, providing a new indication of which events would likely be most effective to optimize through reduction or elimination of the event.

While modern processors are much more capable than their ancestors two or three decades ago in monitoring events, there still remains a very limited hardware capability to monitor and capture such events—e.g. the low number of event counters and limitations on the multiplexers for selecting events to count pose a considerable restriction to what and how much can be monitored while running programs.

Current profiling methods are able to identify instructions which cause hardware events, such as cache misses or branch mis-predictions, however they provide no indication as to the importance of the particular event. It is not known whether a sampled event was obtained on an instruction address that is rarely affected by such events or whether the sample was obtained on an instruction address that is repeatedly affected. To address this problem, embodiments of the invention employ a method of using two hardware performance counters working in conjunction to identify only those instruction addresses that are affected by a significant number of events. The first counter records the total number of times the selected event is sampled, whilst the second counter records the number of times the selected event is sampled on a previously chosen instruction address. Each counter has its own threshold for generating an event, such as an interrupt signal. If the second counter reaches its threshold before the first counter, then the instruction address is known to be affected by a large number of events and hence worth optimizing. Thus, by filtering out the instructions responsible for the majority of events results in smaller memory requirements for the performance profiler, lower performance impact while profiling, and decreased complexity when attempting to reduce the occurrence of the performance event As such, the invention described herein provides a cost effective mechanism and method to assure that the interrupts posted to performance profilers represent significant events according to program-controllable thresholds.

Performance Monitor Counters in General

Processors from companies such as International Business Machines ("IBM")™, Intel™, Advanced Micro Devices ("AMD")™, and others provide hardware-level registers and counters which are useful in very low level monitoring of the activities of the processors to enable higher-level programs to capture and profile the effectiveness with which the programs are being executed. Events which may be counted in many of these processors are branch mis-predictions and cache misses, as well as others.

These counters and registers may be called by slightly different names depending on the manufacturer, but in general, they each count "events" in the processor at a hardware level, and present these counts to firmware or software programs so that valuable information can be derived. Such counters may be referred to as "Performance Monitor Counters" (PMC), performance measurement hardware, or similar. Most of them allow some degree of configurability by software regarding which events will cause the counters to increment or decrement, whether the counters are to be pre-loaded and/or re-loaded on certain conditions such as underflow or overflow, and whether or not an interrupt should be posted upon certain conditions such as underflow and overflow. Software programs can register an interrupt handler and configure the counters to obtain a wide array of performance measurement information. These performance analysis tools may be referred to as a "profiler" or "performance analyzer". One particular example is "Counter Analyzer" from IBM for use in profiling application programs running on IBM POWER and Cell Broad Engine™ processors.

Figure 2:
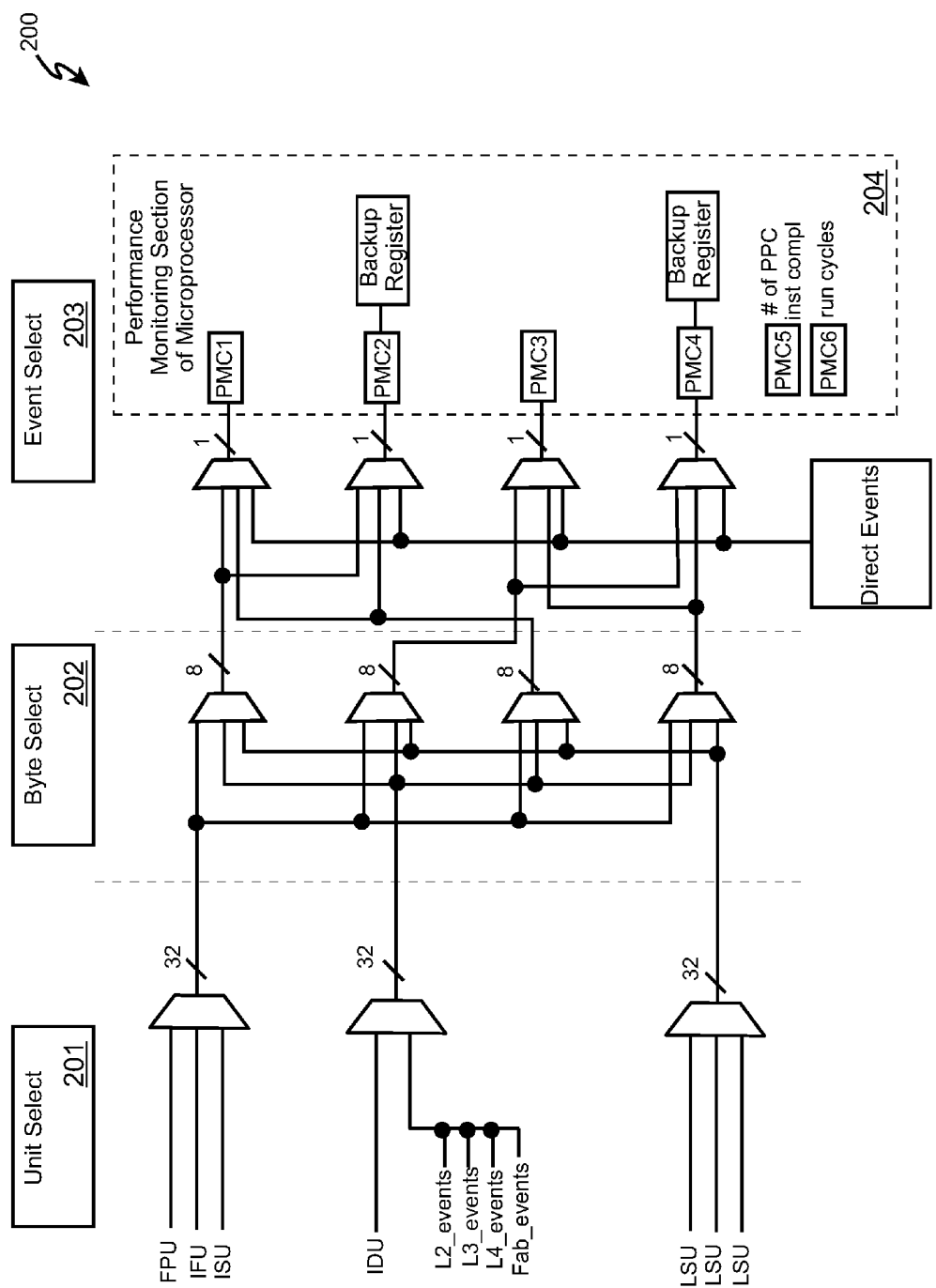
FIG. 2 sets forth an exemplary hierarchical routing structure of a processor to configure which events are counted by each of the available performance counters in the processor.

For example, FIG. 2 shows the hierarchical event routing (200) provided within the POWER5™ processor from IBM™. The first stage of the routing (201) allows a program to select which unit or units are to be monitored, such as the Floating Point Unit (FPU), Instruction Fetch Unit (IFU), Instruction Sequencing Unit (ISU), Instruction Decode Unit (IDU), cache events (L2, L3, etc.), and the Load/Store Unit (LSU). The second stage (202) of the event routing allows assembly of bit-indicators into bytes which are then routed to multiplexers in the third stage (203) where each performance monitor (PMC#) (204) can be assigned an event source to count. As can be readily observed from this diagram, the number of possible events that can be possibly monitored (e.g. the number of inputs to the first stage of routing) is relatively large compared to the number of events which can be counted at any given time (e.g. the number of performance monitor counters).

Other advanced processors from other manufacturers such as Intel, AMD, etc., have similar finite numbers of counters and event selection hardware. As such, even though the following examples will be described with reference to IBM POWER processors, it should be understood by those ordinarily skilled in the art that the present invention may be usefully realized in conjunction with a wide variety of other processors which provide performance counters.

A Method of Paired Performance Monitor Counters

There are three aspects of the present invention which, in conjunction with each other, provide the ability to monitor events in a new and useful manner which indicates not only the number of times an event has occurred (e.g. simple count of the event), but also the importance of the detected event:

(1) the invention provides a mechanism to randomly pick (e.g. search for) an offending instance of an instruction as identified by the address of an instruction causing a specified event, and, optionally uses a hash of bits to quickly compare the detected offending instruction instance to the particular instruction instance being sampled;

(2) the invention utilizes a first counter (e.g. performance monitor counter__1 in the POWER architecture) to monitor all events of a certain type; and (3) the invention pairs a second counter (e.g. Performance monitor counter__2 in the POWER architecture) to count qualifying occurrences of the event being sampled, such as instruction address matches as configured in (1).

In this manner, the first and second counters are used as a pair. Through selection of instruction addresses, different instructions are "sampled" for a period of time to determine if that particular instruction is contributing significantly to the total number of a particular type of event. The first counter represents the total number of the type of events, whereas the second counter represents the number of events of that type which occurred as the result of the particular instruction at the sampled instruction address. If the monitored instruction is found to not significantly contribute to the overall count of the monitored event type, then a new instruction address is configured for sampling, and the process is repeated until a significant contributor is found.

In a first optional embodiment of the invention, the selection of the sampled instruction is made randomly. In other optional embodiments, the selection process may be user-driven, such as from a list, or driven by other methods and processes, such as addresses of instructions provided from a security program.

In a second optional embodiment of the invention, the "watched" instruction address is stored as a hash value, which allows for quicker comparisons to instruction addresses of instructions which cause the event of interest. In other optional embodiments, other forms of the instruction address may be stored for comparison, such as a full address value, a physical address value, a virtual address value, an offset, or an address mask value.

As a general example of a method according to the invention, consider a scenario in which the event type to be monitored is cache misses, then the first counter is configured to count all occurrences of cache misses. The processor hardware then randomly picks an instruction address of a cache miss, stores the selected address as a hash value, and restarts random sampling to pick cache misses. When a cache miss occurs, the first counter is decremented, and the instruction address of the instruction being processed is compared to the stored hash value. If there is a match, the second counter is decremented, but if not, the total count counter has been decremented anyway. If the second counter reaches a pre-determined terminal condition (e.g. zero in embodiments using decrementing, a maximum value in embodiments using incrementing, etc.) before the total event count in the first counter reaches a pre-determined terminal condition, then it is determined that the instruction at the watched address (e.g. the hashed value) is a significant contributor to the event type. However, if the total count counter (first counter) reaches the terminal condition first, then it is determined that the watched address is not a significant contributor to the event type, and another instruction address to watch is selected.

Through the combined search process for a significantly offending instruction address and the two terminal counter values, a wide variety of significance filters can be configured to execute.

Turning to FIG. 1a, a logical process (100a) according to the invention is shown, which may be realized in circuitry within a microprocessor, in firmware, or a combination of circuitry and firmware, in conjunction with the hardware performance monitor counters (172) of the processor. The hardware performance monitor counters (172) may be those of an IBM POWER processor, such as the example in FIG. 2, or they may be other performance monitor counters in other processors.

The logical process starts (170) by selecting (171) two events for two counters (171) through controlling event selection hardware (172) and configuring the two counters for desired operation (pre-load value, increment or decrement, etc.). In some processors, special counter functions, such as the backup registers in POWER processors, may be used to pre-load, re-load, or save the current or terminal value of the register. This capability varies from one processor to another, but in this example of a POWER5 implementation, the backup registers may be used to preload a counter value so that it may be used in a count-down mode (to zero). Other implementations according to the invention may clear a counter to zero and count up to a terminal value.

Next, an instruction is selected (174) for tracking, and a hash value of its address is hashed and stored (176) in a processor register. To select an instruction, one embodiment according to the present invention waits for the next occurrence of the selected event type, and upon that occurrence, captures the address of the instruction which caused the occurrence. This provides a pseudorandom method of "sampling" which instruction to track next.

Through this logic to this point, two counters are paired in a manner to (a) count a total number of events of a particular type, and (b) count the number of events of the particular type which are caused by the tracked instruction at the stored address. Thus, two otherwise independent performance counters are paired to form a new performance monitor function in the hardware.

Now, the logical process waits for the events of the particular type (178), and when one occurs, the total event counter is updated (179), and the instruction of the current address being executed is compared (180) to the hash of the tracked instruction address (177). If there is a match in the addresses, the second counter is updated (184) and it is checked against a pre-determined or previously configured terminal value X (185). If it has reached its terminal value X, then the counter values are captured (186), such as in backup registers in the POWER5 embodiment example, and a software interrupt is posted (190). The process then stops (187) until re-armed or re-configured.

However, if the event was caused by the tracked address, but the terminal condition for the second register has not been reached (185), then the total count is checked (182) against another predetermined or pre-configured terminal value Y. If the total count has not yet reached the terminal count Y for total events, then the logical process awaits (178) the next occurrence of the event.

Otherwise, if a total number of events Y have been counted in the first counter, but the tracked instruction has not contributed enough of them (e.g. less than the terminal condition value X), then the state machine is cleared and both counters are restored to initial values (183), and a new instruction is selected (174).

In this manner, the logical process searches until it finds an instruction which contributes X events in less than (or equal to) Y total events of the selected type. In other words, the paired counters provide the two components of a significance factor, such as a ratio X:Y. Instructions which have a significance factor less than X:Y are ignored (e.g. filtered from reporting to the profiler tool).

PARTICULAR EXAMPLES

In the following descriptions of FIGS. 1b-1d, more particular examples of operation according to the invention and with reference to one embodiment in conjunction with a POWER5 processor are given. It should be kept in mind by the reader, however, that this is merely one possible embodiment according to the invention, and does not represent the entirety of possible embodiments, whereas the invention may be utilized in conjunction with a wide variety of processors which provide at least two performance event counters.

Figure 1B:
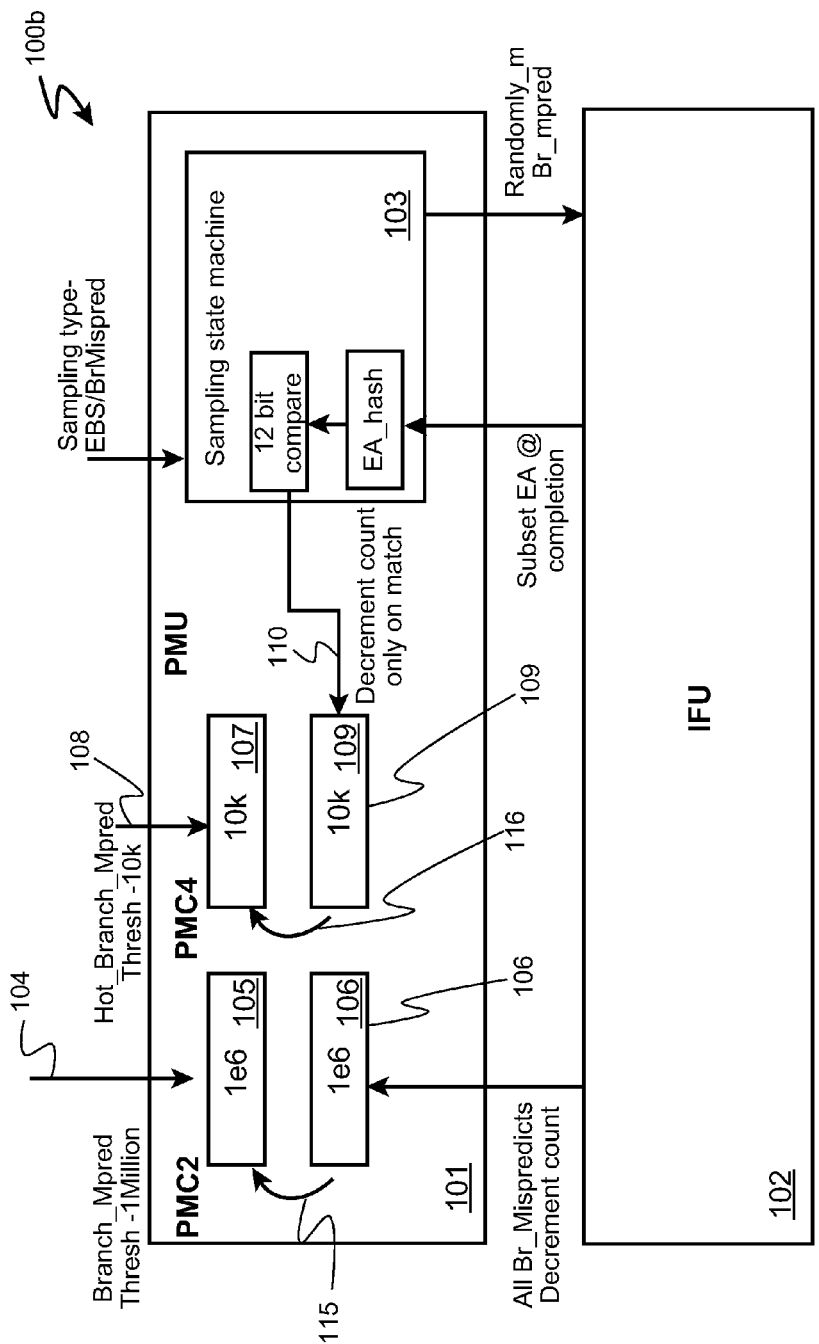
Figure 1C:
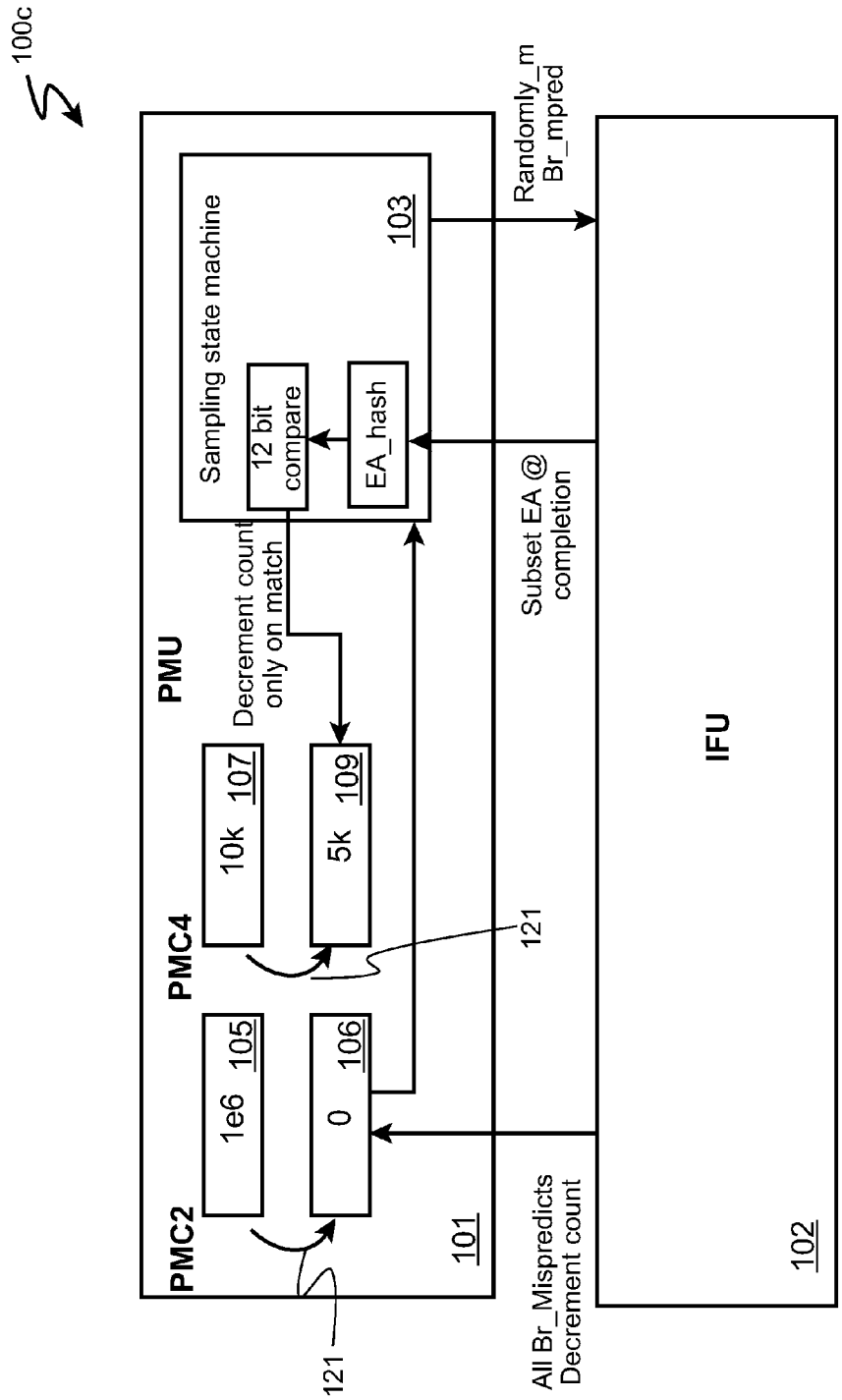
Figure 1D:
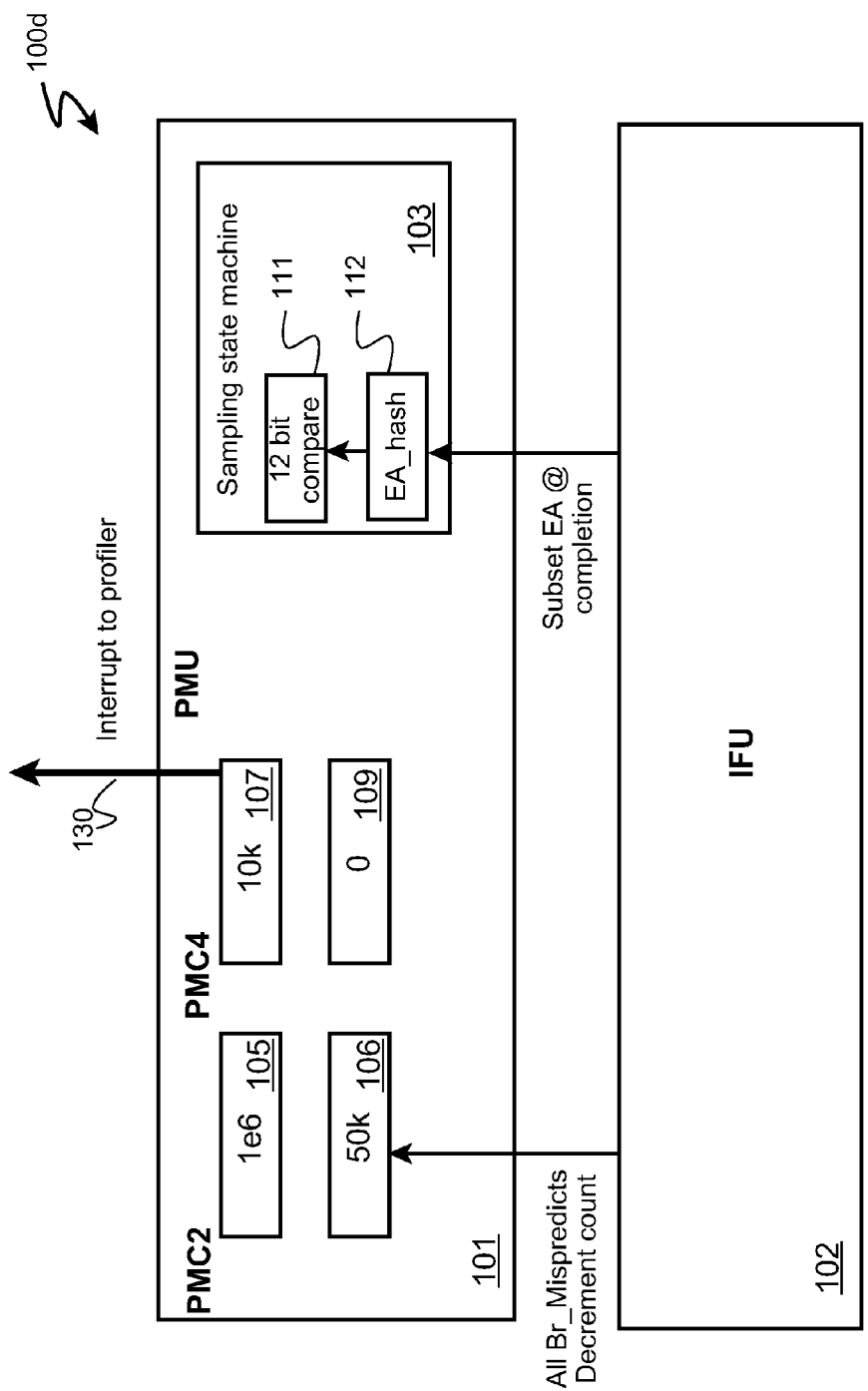

FIGS. 1b-1d are used to illustrate this example embodiment's particular invention. In this scenario, the embodiment of the invention is going to find which instructions are causing branch mis-predictions, which lower the performance of the processor by reducing the efficacy of the pipeline. Reducing the number of branch mis-prediction events would allow the branch predicting hardware to more effectively keep the pipeline loaded for more efficient execution.

So, as shown (100b) in FIG. 1b, the event routing multi-plexers are set to monitor IFU (102) branch mis-predictions events using the performance monitoring hardware (101). The total event counter (first, PMC2) (105, 106) is configured (104) to count down from one-million (e.g. the terminal value X), while the watched-instruction counter (second, PMC4)

(107, 109) is configured (108) to count down from 10 thousand (e.g. the terminal value Y). So, in this example, the first counter will counts all occurrences of branch mis-predicts, while the second counter will count branch mis-predictions caused by a particular instruction at a particular address. The values in both counters are stored (115, 116) in backup registers.

Next, the performance monitoring hardware randomly waits for a branch mis-prediction event, and when it occurs, it stores a hash of the Effective Address (EA) in a internal register, and decrements (101) the first and second counters. Now, the logic has selected this particular instruction at this particular address to track until either (a) a total number X of branch mis-predictions has occurred or (b) the total number Y of branch mis-predictions has been caused by the instruction stored at the tracked address.

Next, the hardware (101) randomly chooses another branch mis-predict event, compares it to the tracked address (e.g. the hashed and stored address value). If there is an address match, then both counters are decremented, otherwise, if there is not match, only the total count counter is decremented.

In this example using count down counters, when the total counter reaches zero first (e.g. Y total events have been counted) but the tracked instruction has not contributed enough events to be significant (e.g. the second counter is >=0), then the counting state machine is cleared and reset, such that the two counters are reloaded (121) with the terminal values X and Y, and the hardware repeats the process of waiting for another random branch mis-prediction event, storing a new instruction address (e.g. selecting another address to track), and counting until a counter counts X or Y branch mis-predictions, as shown (100c) in FIG. 1c.

Figure 3:
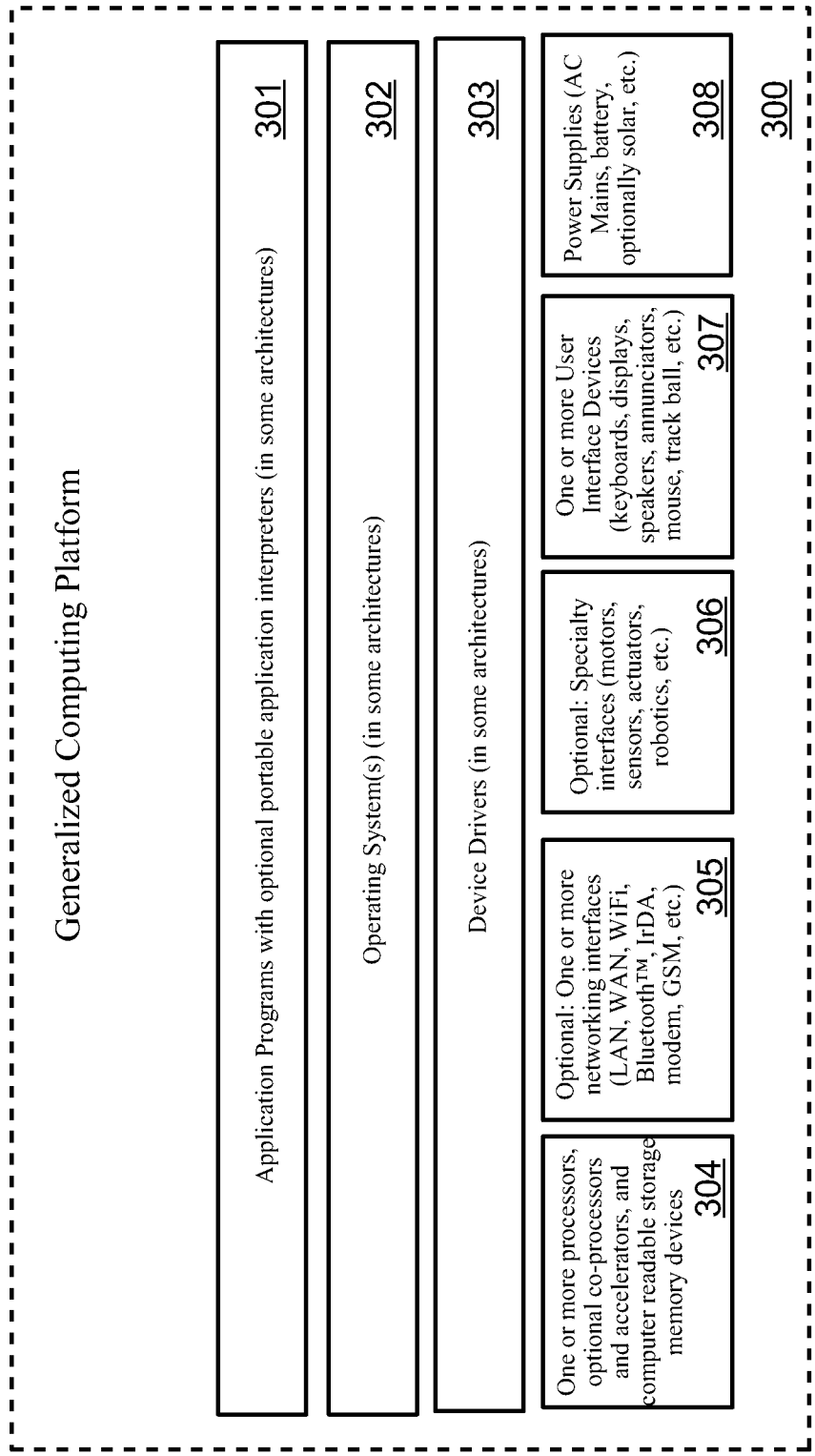
FIG. 3 provides a generalized view of computing platforms.

However, as shown (100d) in FIG. 1d, if the second counter (109) reaches terminal condition (e.g. zero in a decrementing embodiment) before the total event counter (106) reaches its terminal condition, then a source of at least X:Y branch mis-predictions has been found, and an interrupt is posted (130) to the software so that the effective address (112) can be reported, optionally along with the counter values, in order to proceed with optimization steps Suitable Computing Platform Regarding computers for executing the logical processes set forth herein, it will be readily recognized by those skilled in the art that a variety of computers are suitable and will become suitable as memory, processing, and communications capacities of computers and portable devices increases. The present invention may be realized for many different processors used in many different computing platforms. FIG. 3 illustrates a generalized computing platform (300), covering well-known computing platforms including but not limited to "Personal Computers", web servers (e.g. IBM iSeries™ server), enterprise servers, and portable devices such as personal digital assistants and smart phones. Computing platforms may be equipped with an operating systems (302) such as Microsoft™ Windows™ or IBM™ AIX™, Palm OS™, Microsoft Windows Mobile™, UNIX, LINUX, Google Android™, Apple iPhone™ operating system, and others, in order to allow execution of one or more application programs to accomplish the computer-implemented methods described herein. These computing platforms and operating systems are well known and are openly described in any number of textbooks, websites, and public "open" specifications and recommendations. Diagrams and further details of these computing systems in general (without the customized logical processes of the present invention) are readily available to those ordinarily skilled in the art.

Many such computing platforms, but not all, allow for the addition of or installation of application programs (301) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The hardware portion of a computing platform typically includes one or more processors (304) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (305) may be provided, as well as specialty interfaces for specific applications. If the computing platform is intended to interact with human users, it is provided with one or more user interface devices (407), such as display(s), keyboards, pointing devices, speakers, etc. And, each computing platform requires one or more power supplies (battery, AC mains, solar, etc.).

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, components, but do not preclude the presence or addition of one or more other features, integers, steps, operations, elements, components, and groups thereof, unless specifically stated otherwise. Particular quantities of features, integers, steps, operations, elements, components, and groups thereof, are provided as example embodiments and should not be construed as critical limits, unless such is specifically set forth in the disclosure.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical device.

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. An automated method for identifying specific instructions causing performance degradation within a processing element while running a program using paired performance sampling comprising:

pairing in microprocessor hardware a first performance counter and a second performance counter by configuring the first performance counter to count all events of a selected type or source, and configuring the second counter to count a subset of events within the selected type or source of events;

upon a first occurrence of an event of the selected type or source, capturing an address value representing a storage location of an instruction instance causing the first event;

upon subsequent occurrences of events of the selected type or source:

counting with the first performance counter all events of the selected type or source;

counting with the second performance counter only events which are caused by instructions having addresses matching the captured address value;

wherein the counting is continued until the first performance counter reaches a first terminal value or until the second performance counter reaches a second terminal value;

responsive to the first performance counter reaching the first terminal value prior to the second performance counter reaching the second terminal value:

clearing the performance counters by repeating the pairing;

selecting another instruction to track by repeating the step of waiting for another occurrence of the event and capturing another instruction address; and repeating the counting with the pair of performance counters until one or both reach the terminal values; and responsive to the second performance counter reaching the second terminal value prior to or concurrently with the first performance counter reaching the first terminal value, posting an interrupt to an interrupt handler to notify a program that a significant source of the event has been found as represented by the currently captured address.

2. The method as set forth in claim 1 wherein the capturing of an address value associated with an instruction upon a first occurrence of an event of the selected type or source comprises randomly capturing an address of an instruction causing the event.

3. The method as set forth in claim 1 wherein the capturing of an address value comprises storing a hash value of the instruction address.

4. The method as set forth in claim 1 wherein the first performance counter is seeded with a non-zero value during the configuration, wherein counting comprises decrementing, and wherein the first terminal value is a zero value.

5. The method as set forth in claim 1 wherein the second performance counter is seeded with a non-zero value during the configuration, wherein counting comprises decrementing, and wherein the second terminal value is a zero value.

6. The method as set forth in claim 1 wherein the posting of an interrupt to an interrupt handler further comprises transferring one or more parameters to the interrupt handler selected from a group comprising the captured instruction address value, the value of the first performance counter, and a ratio of the number of events counted from the instruction at the captured address to the total number of events counted of the selected type or source.

7. The method as set forth in claim 1 wherein the posting of an interrupt comprises posting of a hardware interrupt signal within the microprocessor.

8. The method as set forth in claim 1 wherein the posting of an interrupt comprises posting an interrupt to a performance profiler tool.

9. A computer program product for identifying specific instructions causing performance degradation within a processing element while running a program using paired performance sampling comprising:

a computer readable storage memory not including a signal;

first program instructions to pair in microprocessor hardware a first performance counter and a second performance counter by configuring the first performance counter to count all events of a selected type or source, and configuring the second counter to count a subset of events within the selected type or source of events;

second program instructions to, responsive to a first occurrence of an event of the selected type or source, capture an address value representing a storage location of an instruction instance causing the first event;

third program instructions to, responsive to subsequent occurrences of events of the selected type or source:

count with the first performance counter all events of the selected type or source;

count with the second performance counter only events which are caused by instruction instances having storage location addresses matching the captured address value;

wherein the counting is continued until the first performance counter reaches a first terminal value or until the second performance counter reaches a second terminal value;

fourth program instructions to, responsive to the first performance counter reaching the first terminal value prior to the second performance counter reaching the second terminal value:

clear the performance counters by repeating the pairing;

select another instruction to track by repeating the step of waiting for another occurrence of the event and capturing another instruction instance storage address; and repeating the counting with the pair of performance counters until one or both counters reach the terminal values; and fifth program instructions to, responsive to the second performance counter reaching the second terminal value prior to or concurrently with the first performance counter reaching the first terminal value, post an interrupt to an interrupt handler to notify a program that a significant cause of the event has been found as represented by the currently captured instruction instance storage address;

wherein the first, second, third, fourth, and fifth program instructions are stored by the computer readable storage memory.

10. The computer program product as set forth in claim 9 wherein the capturing of an address value associated with the storage of an instruction instance upon a first occurrence of an event of the selected type or source comprises randomly capturing an address of an instruction causing the event.

11. The computer program product as set forth in claim 9 wherein the capturing of an address value comprises storing a hash value of the instruction address.

12. The computer program product as set forth in claim 9 wherein the first performance counter is seeded with a non-zero value during the configuration, wherein counting comprises decrementing, and wherein the first terminal value is a zero value.

13. The computer program product as set forth in claim 9 wherein the second performance counter is seeded with a non-zero value during the configuration, wherein counting comprises decrementing, and wherein the second terminal value is a zero value.

14. The computer program product as set forth in claim 9 wherein the posting of an interrupt to an interrupt handler further comprises program instructions to transfer one or more parameters to the interrupt handler selected from a group comprising the captured instruction instance storage address value, the value of the first performance counter, and a ratio of the number of events counted from the instruction at the captured address to the total number of events counted of the selected type or source.

15. The computer program product as set forth in claim 9 wherein the posting of an interrupt comprises posting of a hardware interrupt signal within the microprocessor.

16. The computer program product as set forth in claim 9 wherein the posting of an interrupt comprises posting an interrupt to a performance profiler tool.

17. A system for identifying specific instructions causing performance degradation within a program using paired performance sampling comprising:
    in microprocessor hardware, a pair of counters having a first performance counter and a second performance counter, the first performance counter configured to count all events of a selected type or source, and the second counter configured to count a subset of events within the selected type or source of events;
    an instruction sampler portion of the microprocessor hardware which, upon a first occurrence of an event of the selected type or source, captures an address value representing a storage location of an instruction instance causing the first event;
    a counter controller portion of the microprocessor hardware which, upon subsequent occurrences of events of the selected type or source:
        counts with the first performance counter all events of the selected type or source;
        counts with the second performance counter only events which are caused by instructions having addresses matching the captured address value;
        wherein the counting is continued until the first performance counter reaches a first terminal value or until the second performance counter reaches a second terminal value;
    a reset portion of the microprocessor hardware which, responsive to the first performance counter reaching the first terminal value prior to the second performance counter reaching the second terminal value:
        clears the performance counters by repeating the pairing;
        selects another instruction to track by repeating the step of waiting for another occurrence of the event and capturing another instruction address; and
        repeats the counting with the pair of performance counters until one or both reach the terminal values; and
    a significant event source detector portion of the microprocessor hardware which, responsive to the second performance counter reaching the second terminal value prior to or concurrently with the first performance counter reaching the first terminal value, posting an interrupt to an interrupt handler to notify a program that a significant source of the event has been found as represented by the currently captured address.

18. The system as set forth in claim 17 wherein the instruction sampler randomly captures an address of an instruction instance causing the event.

19. The system as set forth in claim 17 wherein the instruction sampler stories a hash value of the instruction address.

20. The system as set forth in claim 17 wherein the counter controller and reset seed the first performance counter with a non-zero value, wherein counting comprises decrementing, and wherein the first terminal value is a zero value.

21. The system as set forth in claim 17 wherein the counter controller and reset seed the second performance counter with a non-zero value, wherein counting comprises decrementing, and wherein the second terminal value is a zero value.

22. The system as set forth in claim 17 wherein the significant event source detector transfers one or more parameters to an interrupt handler selected from a group comprising the captured instruction instance storage address value, the value of the first performance counter, and a ratio of the number of events counted from the instruction at the captured address to the total number of events counted of the selected type or source.

23. The system as set forth in claim 17 wherein the significant event source detector posts a hardware interrupt signal within the microprocessor.

24. The system as set forth in claim 17 wherein significant event source detector posts an interrupt to a performance profiler tool.

* * * * *